3,103,813
METHOD AND APPARATUS FOR SAMPLING PRODUCTION OF SUBTERRANEAN RESERVOIRS
Henry A. Bourne, Jr., Earl W. Sutton, and James C. Albright, Ponca City, Okla., assignors to Continental Oil Company, Ponca City, Okla., a corporation of Delaware
Filed Oct. 28, 1960, Ser. No. 65,696
3 Claims. (Cl. 73—155)

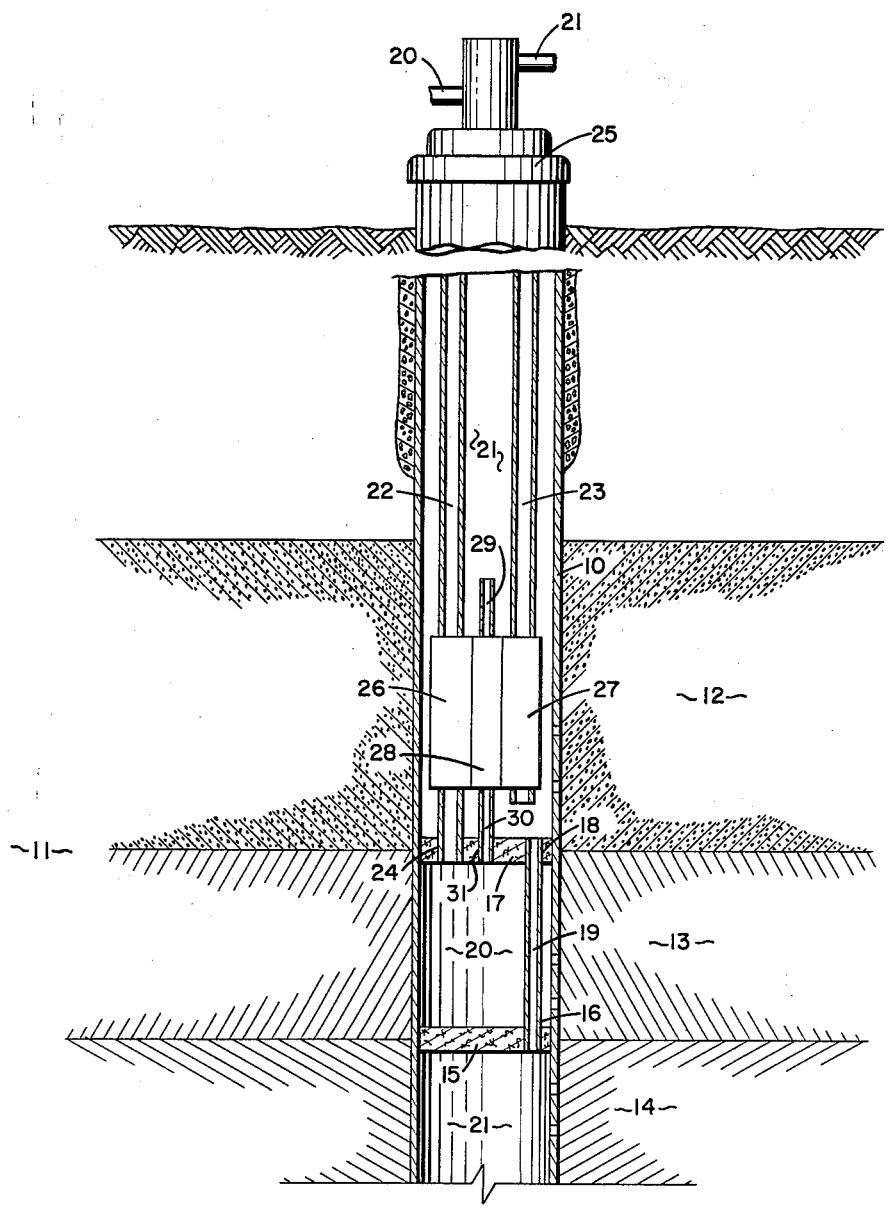
INVENTORS.
HENRY A. BOURNE JR.
EARL W. SUTTON
JAMES C. ALBRIGHT
BY
L. David Trapnell
ATTORNEY

United States Patent Office 3,103,813
Patented Sept. 17, 1963

This invention relates to a method of logging the fluid production of subterranean reservoirs traversed by well bores, and more particularly is directed to locating and identifying fluids produced with respect to the quantity of each fluid obtained from hydrocarbon-bearing reservoirs. The invention is especially adapted for use in determining the characteristics and locations of components of the production stream, such as oil, gas, water, and brine, from those reservoirs being produced by natural flow or with pumping apparatus.

Locating and identifying the formations within a reservoir which produces the various components of the production stream have been attempted by a number of various methods. There is one general approach wherein the fluid column in the well bore is replaced by a specially conditioned fluid having known characteristics which are altered in a known specific manner upon contact with the normally produced fluids. This use of a conditioning fluid is difficult to manage under field conditions in that it often invades the reservoir corrupting the validity of any production therefrom or a down-hole pressure imbalance upsets the requisite conditions, and such a method requires the additional expense of suspending production activities and the installation of equipment not normally required.

Another method of locating and identifying production fluids is to pass one of the numerous types of logging or sampling apparatus through the well bore in order to analyze the fluid production either in place or at the surface, which requires the use of an expensive and complicated apparatus together with the requisite production interruptions. The use of such apparatus, however, does not provide reliable information as to the quantities of component fluids produced from the various formations within the reservoir.

In other well known methods for analyzing fluid production from formations, a portion of the reservoir to be tested is sealed off by packing means and the fluids are withdrawn from the sealed zone for analysis. This requires packing means to be designed and emplaced in such a manner as to prevent seepage of fluids from adjacent formations into the sealed zone, otherwise the invading fluids cause the results to be inaccurate and misleading. Thus it may be seen that the methods of the prior art have disadvantages either with regard to the accuracy or the type of information obtained, which have not been resolved prior to the presently disclosed invention.

An object of the present invention is to provide an improved method for determining the location of producing formations within a subterranean reservoir producible by natural flow or pumping.

Another object of the present invention is to provide an improved method for determining the identification of the fluids produced from the formations within a subterranean reservoir producible by natural flow or pumping.

A further object of the present invention is to provide an improved method for determining the quantities of the individual fluids making up the production from the formations within a subterranean reservoir producible by natural flow or pumping.

A still further object of the present invention is to provide an improved method of determining the location, identification, and quantities of fluids produced from the formations within a subterranean reservoir producible by natural flow or pumping during actual conditions of production.

Other objects and advantages of the present invention will be apparent from the detailed description contained hereinbelow.

Broadly, this invention comprises isolating a zone of a well bore traversing a subterranean reservoir at predetermined depths in formations producible by natural flow or pumping, and maintaining pressures in the isolated and adjacent zones substantially equal while recovering fluids from the isolated zone during normal production activities. The fluids from the isolated zone at known depths are analyzed to determine the identity of each component of the fluid and the amount of each produced in order to log the production profile of the reservoir.

In the drawing:

The FIGURE is a schematic representation of one embodiment of the disclosed inventive method as applied to an intermediate zone of the well bore in the adjacent subterranean reservoir.

The drawing described in the ensuing detailed description of the method disclosed is not to be construed as limiting the invention in scope or content, but rather is included for illustrative purposes only. Referring to the drawing, a subterranean well bore 10 traverses a subterranean reservoir generally designated as 11 and having a plurality of fluid producing formations 12, 13, and 14. The well bore contains a first packer 15 having an aperture 16 and a second packer 17 having an aperture 18 adapted to receive a bypass line 19 whereby a testing zone 20 and a producing zone 21 are defined within the well bore. Also within the well bore are a pair of fluid conduits 22 and 23, respectively extending from zones 20 and 21 to the surface, the former extending through an aperture 24 in packer 17 into zone 20. These conduits extend through a suitable well head assembly 25, wherein the conduits are maintained separately to provide for recovery of the individual fluids from the zones without commingling of the fluids. There are flow control means such as a pair of pumps 26 and 27 disposed in conduits 22 and 23 respectively, connected to a differential pressure control flow valve 28 having a pressure conduit 29 in communication with zone 21 and a pressure conduit 30 extending through an aperture 31 of packer 17 in communication with zone 20, which controls the pumping rates of the pumps to maintain substantially equal pressure in each of the zones.

The present method of logging the production profile of a subterranean reservoir is directed to those reservoirs which are producible by either natural flow or pumping means, particularly, but not limited to, hydrocarbon-producing reservoirs. Production from such reservoirs is normally a composite of fluids such as oil, gas, water and brine, and it is advantageous to know the location and identity of the various formations contributing each fluid, together with the quantities of each produced. This method is adaptable for determining the production characteristics of a specific zone within a reservoir, and also in logging the profile for a complete reservoir.

The first step of the present invention is to isolate a particular zone encompassing a formation or formations within the reservoir which is accomplished by placing at least two partition means, such as conventional packer devices, in the well bore, except in the instance of a zone located at the bottom of the well bore wherein one such partition means is sufficient. These partition means are set at predetermined depths in order to isolate a specifically located zone within the well bore from the remaining production zone or zones within the well bore, as zone packers 15 and 17 separate well bore 10 into the isolated testing zone 20 and production zone 21. As pointed out more specifically below, the partition means do not have to be seated in such a manner as to withstand the great drawdown pressures normally experienced in prior art methods when the presently disclosed method is utilized.

The lower packer is provided with aperture 16 adapted to receive the bypass line 19, as does packer 17 have aperture 18 whereby the previously separated segments of the production zone 21 are connected by the bypass line to enable normal production from the single pumping means 27. The upper packer 17 is provided with aperture 24 to receive the conduit 22 thereby establishing separate communicating means for the pumping means 26 from testing zone 20, said packer is also provided with aperture 31 whereby the pressure conduit 30 connected to the differential pressure control means 28, such as a conventional differential pressure control flow valve.

Subsequent to positioning the equipment above in the manner disclosed, the flow control or pumping means are placed in operation to produce the fluids contained within the formations of reservoir 11, while being controlled by the pressure sensitive means 28. Since the differential pressure control means is in communication with zones 20 and 21 adjacent formations 13 and 12 and 14 respectively, the control means, being preset to maintain substantially equal pressures within said zones, will cause the pressure at the faces of the packer to be substantially equal.

In the instance of a subterranean reservoir having sufficient natural energy to produce the hydrocarbons therefrom by the natural flow to the surface, the arrangement of equipment, partition means, etc. is essentially the same except that the pumping means are unnecessary. The flow control means within each conduit can be conventional choke devices in the flow lines to the surface which are in turn controlled by a pressure sensitive control means whereby the differential pressures at the faces of the partition means are maintained substantially equal. The production from each zone is thereby controlled as above so that it conforms to normal production conditions.

Therefore the partitioning means need to be seated only to form a seal against the well bore, and not sufficiently to withstand the normal pressure differentials occurring during production activity which cause the leakage occurring in known methods whereby accuracy is not achieved. This also causes the pumping means to be operated as during actual conditions of production, thereby causing the fluids produced to be recovered in substantially identical production as is achieved during normal conditions. The fluids from testing zone 20 are produced by pump 26 through conduit 22 to the surface through well head 25 into separate storage facilities not indicated, and fluids from producing zone 21 are produced by pump 27 through conduit 23 in the same manner. The separate streams of fluids are not commingled during the logging program, but rather the stream from the testing zone is diverted into separate storage whereby the quantity and identity of the various components can be determined in a conventional manner.

Since the exact location of the testing zone is known by the placement of the partitioning means, it is possible to readily determine the precise identity, quantity and location of production from a particular zone within the well bore. This information is determinable for a single zone by the above procedure, but it is also possible to direct a complete logging program to either a greater number of fluid producing formations traversed by the well bore or even the complete well bore, merely by repeating the aforementioned steps at different predetermined depths each under normal production conditions.

Thus it may be seen that the presently disclosed method achieves a way of conducting a logging program during conditions of actual production, not under disproportionate pressures, etc., which overcomes the problems of the prior art. The embodiment of the invention included in the drawing and the description of the operation thereof is not to be construed as limiting the scope of the invention but rather the invention is the method for obtaining the logging program as defined in the claims hereof.

We claim:
1. A method for sampling production of a fluid-producing subterranean formation traversed by a well bore extending from the surface which comprises partitioning said bore adjacent said formation into at least two separate zones at the naturally-occurring pressures of said zones, producing fluid from said zones without intermingling fluids from separate zones while maintaining pressures within the well bore adjacent said zones at a substantially equal amount, and recovering separately to the surface the fluids from said zones.

2. An apparatus for sampling production of a fluid-producing subterranean formation traversed by a well bore extending from the surface which comprises:
   a. at least one partitioning means in said well bore dividing said well bore adjacent said formation into separate fluid-producing zones;
   b. fluid conduits extending separately from the surface into each of said zones;
   c. a flow control means connected to each of said fluid conduits; and
   d. a differential pressure control means having pressure conduits communicating with each of said zones, said pressure control means communicating with said flow control means whereby the fluids are withdrawn from each of said zones at a substantially equal pressure and produced to the surface without intermingling.

3. An apparatus for sampling production of a fluid-producing subterranean formation traversed by a well bore extending from the surface which comprises:
   a. an upper partitioning means in said well bore adjacent said formation adapted to receive a fluid conduit, a pressure conduit and a bypass conduit therethrough;
   b. a lower partitioning means in said well bore adjacent said formation adapted to receive a bypass conduit therethrough;
   c. a bypass conduit extending through said upper and lower partitioning means defining a sampling zone between said partitioning means and a producing zone about said sampling zone;
   d. a first fluid conduit extending from the surface through said upper partitioning means into said sampling zone;
   e. a second fluid conduit extending from the surface into said producing zone above said upper partitioning means;
   f. a pumping means connected to each of said fluid conduits; and
   g. a differential pressure control means having pressure conduits communicating with each of said zones, said pressure control means communicating with said pumping means whereby fluids are withdrawn from each of said zones at a substantially equal pressure and produced to the surface without intermingling.

References Cited in the file of this patent
UNITED STATES PATENTS

| | | |
|---|---|---|
| 2,242,166 | Bennett | May 13, 1941 |
| 2,678,605 | Tappmeyer | May 18, 1954 |
| 2,799,226 | Kangas | July 16, 1957 |